Patented Mar. 24, 1925.

1,531,098

UNITED STATES PATENT OFFICE.

KARL HOLZACH, OF MANNHEIM, GERMANY, ASSIGNOR TO BADISCHE ANILIN- & SODA-FABRIK, OF LUDWIGSHAFEN-ON-THE-RHINE, GERMANY, A CORPORATION OF GERMANY.

COLORING MATTER.

No Drawing.   Application filed May 10, 1924. Serial No. 712,430.

*To all whom it may concern:*

Be it known that I, KARL HOLZACH, a citizen of the German Empire, residing at Mannheim, Germany, have invented certain new and useful Improvements in Coloring Matters; and I do hereby declare the following to be a full, clear, and exact description of the invention, such as will enable others skilled in the art to which it appertains to make and use the same.

This invention relates to certain improvements in the coloring matters of the known type which are obtainable by condensing dinitro stilbene disulfonic acid (or its equivalent dinitro dibenzyl disulfonic acid) with aromatic amins or amino azo sulfonic acids.

I have discovered that coloring matters of particular value are obtained by condensing dinitro stilbene (or dinitro dibenzyl) disulfonic acids with amino azo compounds, whether sulfonated or not, containing salicylic acid substituted by the azo group in para position to the hydroxyl group, such compounds being represented by the following formula:

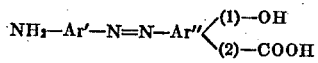

in which formula Ar' stands for an aryl residue (phenylene, naphthylene or substitution products thereof, including sulfonic acids) and Ar'' for phenyl, or a substitution product thereof, such as cresyl, whether containing, or not, sulfonic acid groups. Such amino azo compounds, when condensed in an alkaline medium and at an elevated temperature with dinitro stilbene disulfonic acid, or its equivalents, give orange or brown coloring matters on cotton, possessing extraordinary fastness to soap, boiling and light, which properties, as I have also discovered, are further enhanced by aftertreating the dyeings with suitable salts containing a heavy metal, such as copper sulfate, chromium fluorid, alkali metal bichromate. The said coloring matters are especially suitable for producing batik articles, which may be done by applying a wax resist to the fabric in the known manner, then dyeing with the coloring matters mentioned at ordinary temperature and afterwards treating with a heavy metal salt at between 50 degrees and 60 degrees centigrade, whereupon the wax resist is removed with boiling water.

The following example serves to more exactly describe the manner in which the dyestuffs forming the object of my claim may be prepared, but I do not wish to limit the scope of my claim by this example in any way. The parts are by weight.

47.4 parts of dinitro stilbene disulfonic acid sodium salt

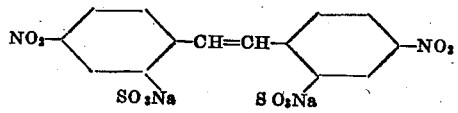

(calculated on dry compound) in the form of a 20 per cent paste, are intimately mixed with 28 parts of the amino azo compound para-amino-phenylene-azo-salicylic acid

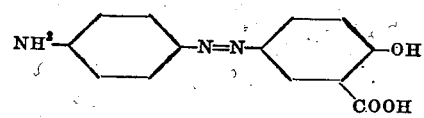

(obtainable from diazotized para-nitraniline and salicylic acid and subsequent reduction) which is employed in the form of its sodium salt and made into a 15 per cent paste), and 35 parts of caustic soda solution of 50 degrees Baumé are then added, whereupon the temperature is raised, within half an hour, to 85 degrees centigrade. The mass is stirred for 6 hours at this temperature and afterwards poured into 500 parts of a 20 per cent solution of common salt. The mixture is neutralised with dilute hydrochloric acid, the dyestuff filtered off and dried. It dyes cotton orange, which dyeing, when aftertreated with chromium fluorid turns brown-orange and with copper sulfate reddish brown. Both these latter dyeings have excellent fastness to light, washing, and boiling.

When 33 parts of the amino azo compound para-alpha-amino-naphthylene-azosalicyclic acid

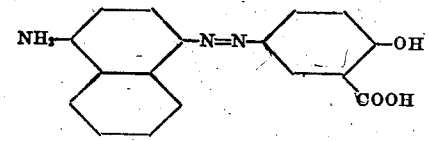

(obtainable by coupling diazotized paraamino-salicyclic acid with alpha-naphthylamine) are employed instead of the phenylene compound, a coloring matter producing reddish brown dyeings on cotton is obtained, and the shades obtained by aftertreatment with chromium fluorid or copper sulfate are brown, or violet brown, respectively. Derivatives, containing substituents in the salicylic acid residue or in the arylene nucleus, or in both, may also be employed. As a few examples of such substituted dyestuffs I mention the coloring matter derived from the amino azo compound para-amino-phenylene-azo-ortho-cresotinic acid (direct shade brownish orange, with copper sulfate turning copper brown, with chromium fluorid brown) or from the amino azo compound obtained from diazotized para-nitro-ortho-anisidine and salicyclic acid and subsequent reduction (direct shade reddish orange, with copper salt copper brown and with chromium salt brown).

What I claim is:

The new coloring matters which are produced by condensing in an alkaline medium dinitro stilbene disulfonic acid and an amino azo compound containing ortho hydroxylated aryl carboxylic acid substituted by the azo group in para position to the hydroxy group, the coloring matters dyeing cotton directly orange or brown shades which dyeings on treatment with a heavy metal salt assume altered shades and enhanced fastness.

In testimony whereof I hereunto affix my signature.

KARL HOLZACH.

Witnesses:
GABRIELE FLUCH,
JANE GLEISH.